F. W. ACEE.
Musical Notation.

No. 122,096.

Patented Dec. 26, 1871.

ILLUSTRATION.
REST FOR THE WEARY.

[From *Happy Voices*, by permission of Am. Tract Society.]

1. "In the Christian's home in glo-ry. There remains a land of rest: There my Saviour's gone before me To fulfil my soul's request.

CHORUS:
{ There is rest for the wea-ry, There is rest for the wea-ry, There is rest for the wea-ry, There is rest for you.
{ On the other side of Jordan, In the sweet fields of Eden, Where the tree of life is blooming. There is rest for you.

TREBLE.

ALTO.

TENOR.

BASS.

ALPHABET OF COLORED NOTES:

Natural Scale, Key of C.    Do. Ra. Me. Fa. Sol. La. Se. Do.

UNITED STATES PATENT OFFICE.

FIELDING WALLACE ACEE, OF COLUMBUS, GEORGIA.

IMPROVEMENT IN MUSICAL NOTATION.

Specification forming part of Letters Patent No. 122,096, dated December 26, 1871.

I, FIELDING WALLACE ACEE, of Columbus, in the county of Muscogee, State of Georgia, have invented certain Improvements in Music-Notes, of which the following is a specification:

This invention relates to an improvement on music-notes. In modern music there are seven primary notes used, the eighth being a repetition of the first, and perfecting an octave of the scale.

The first seven letters of the alphabet are used to represent the degrees of the scale, which are written on the staff, the eighth letter being a repetition of the first. These letters are called by seven syllables—viz., Do, re, mi, fa, sol, la, si, and do—and are applied to a like number of uniform black characters, called notes, printed on the lines and spaces of the staff.

Before any one can read or sing a piece of music he must become perfectly acquainted with the scale of letters written on the staff, with the transposition of the keys, signs, &c., which involves an amount of study and research that few of the masses ever acquire. After having the information before mentioned, it requires a quick perception, a true eye, and a ready memory to read correctly the notes of a tune; and professors often commit errors in reading or singing new pieces.

In the colored notes, which consists of an application of seven distinct colors to the seven notes of the scale, the eighth being a repetition of the first, the singer is never at a loss to call the notes by their proper names, though written in the same way on the lines and spaces of the staff, yet each note bearing a distinct color is at once known and designated. The pupil does not depend altogether upon the position of the note on the scale to designate it, but is at once assisted by the color. Another advantage is also obtained in sounding the notes. Having once learned the relative position of each colored note on the scale, so soon as he sees the note he is more quickly prepared to give it the correct sound. I have adopted the following colors as the most distinct and suitable for the notes of the scale: (See alphabet in illustration:) Green, yellow, red, brown, blue, black, and pink, applied to the syllables do, re, mi, fa, sol, la, and si. The shape of the notes are the same as used in all modern music. The arrangement of each piece and each part in every piece is in harmony with the keynote, (see in illustration "Rest for the Weary"—treble, alto, tenor, bass,) which governs the position of the colored notes on the lines and spaces of the staff. The application of color to the notes of the scale in music brings the heretofore difficult and beautiful art of singing by note, which is the only correct method, within the reach of every one.

By this improvement the pupil will be able, after committing to memory the alphabet of colored notes, learning to sound the notes of the scale, and to keep the time correctly, to read at sight and sing correctly and rapidly any piece of music presented to him.

In the illustration the colored notes have been applied to the tune called Rest for the Weary—A, the treble; B, the second treble or alto; C, the tenor; D, the bass; E, the alphabet of colored notes; F, the syllables of the notes.

What I claim and desire to secure by Letters Patent, is—

The method of musical notation herein described, each of the seven notes of the scale being indicated by a distinctive color, as shown, and for the purpose set forth.

F. W. ACEE.

Witnesses:
F. G. BLAU,
J. L. DOZIN.

(102)